July 10, 1951
M. KATZ
2,559,633
HYDRAULIC DEVICE FOR DAMPING OSCILLATIONS FOR SPRING SUSPENSIONS OF VEHICLES AND THE LIKE
Filed July 28, 1949
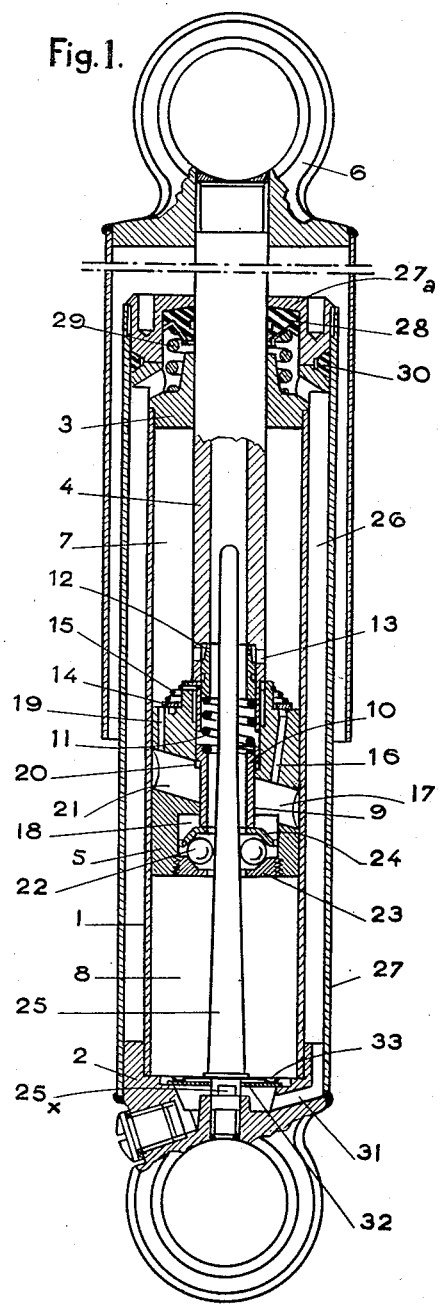
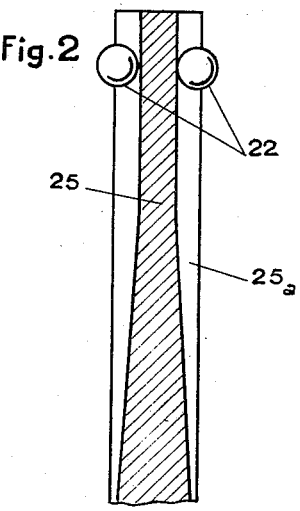
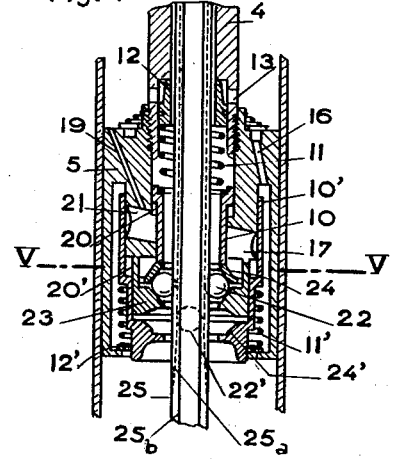
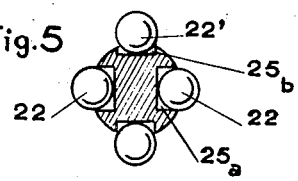
INVENTOR
Maurice Katz
BY Cameron, Kerkam & Sutton
ATTORNEYS Patented July 10, 1951

2,559,633

UNITED STATES PATENT OFFICE 2,559,633

HYDRAULIC DEVICE FOR DAMPING OSCILLATIONS FOR SPRING SUSPENSIONS OF VEHICLES AND THE LIKE

Maurice Katz, Neuilly-sur-Seine, France

Application July 28, 1949, Serial No. 107,194
In France August 5, 1948

5 Claims. (Cl. 188—88)

1

The present invention has for its objects changes and improvements in and additions to the hydraulic damping device described and illustrated in my copending application Serial No. 44,054 filed August 13, 1948, for "Hydraulic Device for Damping Oscillations for Spring Suspensions of Vehicles and the Like," and more particularly to the embodiment shown in Figure 6 of the aforesaid application (telescopic damping device of the direct action type).

The aforesaid damping device comprises a piston movable in a liquid-filled cylinder and having ducts connecting its opposite sides and controlled by obturating devices. The obturating member proper is loaded by a spring which is tensioned as a function of displacement of the piston in the direction of compression of the spring only, and the amount of compression is made proportional to the amplitude of the displacement by control mechanism comprising a helical rod fixed to the cylinder and engaging a nut which has threaded engagement with the piston, the movement of the nut relative to the piston serving to actuate a movable member which compresses the spring. During the return stroke of the piston, the movable member is maintained in its position of extreme advancement by the effect of the pressure existing in the liquid chamber under compression.

The new embodiment differs from the preceding and is characterized principally by the fact that the control mechanism of the movable member or pusher which places the obturator spring under compression is constituted by a system of balls retained between a bowl fixed on the piston and an axially movable bowl on which rests the extremity of the pusher opposite to that which bears on the spring, in combination with an axial rod forming a cam and rigid with the cylinder, which rod spreads the balls more or less according to the relative displacements of the piston and cylinder and, by the action of ramps provided on the aforesaid two bowls, impresses corresponding displacements on the pusher.

In the annexed drawing, which shows by way of example various embodiments of the invention:

Fig. 1 is an axial section of the novel hydraulic telescoping damping device of the direct action type, effecting damping variable with amplitude in one direction only, i. e., that of rebound of the vehicle suspension spring, the damping device being shown in the position which it occupies at the end of a given stroke of compression;

Fig. 2 shows, in partial axial section and on a

2 larger scale, a variation of the axial ball-rod mechanism, while Fig. 3 is a plan view of this mechanism;

Fig. 4 shows an axial ball-rod mechanism analogous to that of Fig. 2, but arranged for the control of two pushers for the case where the damping device is to assure the aforesaid damping in two directions and accordingly comprises two obturators; and Fig. 5 is a transverse section on the line V—V of Fig. 4 but showing only the balls and the rod on a larger scale.

As sown in Fig. 1, the damping device is constituted by a cylinder 1 closed at its lower end by a bottom 2 rigid with the wheel of the vehicle (not shown) and at its upper part by a cover 3 through which passes the hollow rod 4 of a piston 5 sliding in the cylinder 1, the rod being fixed by the attachment 6 to the suspended mass of the vehicle.

The piston 5, which separates the two chambers 7 and 8 of the cylinder, comprises in an axial bore a tubular pusher 9 provided with a flange 10 on which is supported a spring 11 which loads an annular valve 12 controlling the passage of oil from the chamber 7 to the chamber 8 through orifices 13 formed in the piston rod. A valve 14, held against the upper face of the piston by a weak spring 15, permits the free passage of oil in the reverse direction, that is to say from the chamber 8 to the chamber 7, through ducts 16 which lead from a space 17 that is elsewhere in communication with a bore 18 in the lower extremity of the piston. On the other hand, a duct 19 assures permanent communication of the chamber 7 with an annular space 20, created by displacements of the pusher 9 and its flange 10 in the piston bore in which the flange slides, through a space 21 which is shown on the figure as an extension of the space 17.

The essential novelty of the present invention resides, as has been said above, in the control mechanism for the pusher 9 for placing under compression the spring 11 which loads the valve 12.

This mechanism consists in a crown of balls 22, retained between two perforated and suitably profiled bowls, of which one bowl 23 is screwed in the lower extremity of the piston 5, while the other bowl 24 is concave in the opposite direction to the first and can slide in the piston bore 18 so as to engage the lower edge of the tubular pusher 9. This movable bowl is moreover indented at its periphery to permit liquid to pass freely from one to the other of its faces. An axial cylindro-conical rod 25, screwed in the bottom 2 of the cylinder, passes through these bowls and the piston and penetrates more or less deeply into the piston rod according to the relative positions of the piston and cylinder, spreading more or less the balls which, by sliding on the ramps of the bowls, assure the desired displacements of the movable bowl and accordingly of the pusher.

Otherwise, the novel damping device comprises an annular compensation chamber 26 constituted by a cylindrical envelope 27 surrounding the cylinder 1, the lower extremity thereof being sealed to the bottom 2 while its upper screwed cover 27a comprises a bore for the passage of the rod 4 of the piston 5. A tight joint 28 compressed by a spring 29 is interposed between the covers of the two cylinders around the said rod, whereas another joint 30 assures tightness at the junction of the two covers.

The compensation chamber 26 communicates with the interior of the cylinder 1 exclusively through a duct 31 formed in the common bottom 2. A flexible membrane 32, disposed around the foot of the rod 25 with its exterior edge applied to the bottom 2 by a spring 33, permits oil from the compensation chamber to pass into the chamber 8 under the effect of aspiration when the piston 5 moves away from the bottom 2, causing said spring to flex. On the contrary, when the piston approaches the bottom, the membrane 32 is pressed down at its center and uncovers one or more flats 25x on the foot of the rod, thus providing a reduced passage for the liquid that is in excess because of penetration of the rod 4 into the chamber 7.

*Operation*

In repose, the chambers 7 and 8 together with the different cavities of the piston and its rod and part of the compensation chamber 26 being full of oil and the piston of the damping device being inserted to a certain depth in the cylinder 1 under the normal load of the vehicle, the rod 25 is engaged in the piston 5 and in the rod 4 of the latter, but only as to its cylindrical part so that the balls 22 occupy their position of minimum spreading to which corresponds the weak initial tension of the spring 11 which loads the valve 12.

When the vehicle passes over an obstacle, the corresponding spring of the suspension is compressed and the piston 5 descends and comes to occupy the position shown in Fig. 1. During this stroke of the piston, the balls 22, under the action of the conical part of the rod 25, are spread and force the pusher 9 upward which compresses the spring 11 proportionately to the stroke made by the piston 5. The oil, under slight compression in the chamber 8 because of the resistance of the membrane 32 to deformation, passes into the upper chamber 7 through the ducts 16 after having lifted the valve 14. The excess oil from the chamber 8 passes through the opening 25x unmasked by the bending of the membrane 32 at the foot of the rod and through the duct 31 into the compensation chamber 26.

In this phase of the operation, the damping device offers only an invariable resistance determined by the flexure of the membrane and generally very small.

On the other hand, during the return movement under the action of rebound of the suspension spring, the oil is compressed in the chamber 7 by the piston 5 which now ascends, and can only pass back into the chamber 8 by passing first through the orifices 13 and then overcoming the resistance opposed by the valve 12 loaded by the spring 11 the tension of which has been increased during the preceding movement of the piston. But the pressure thus created in the chamber 7 is exerted likewise through the duct 19 and the space 21 and in the annular chamber 20, that is to say on the flange 10 of the pusher, the surface of which has been chosen to equal that of the transverse section of the valve 12 exposed to the same liquid pressure. Because of this fact, and since the oil pressure in the chamber has reached a value sufficient to displace the valve 12 from its seat so as to assure a certain delivery of liquid between these two members, the pusher 9, which is subjected to the same pressure in the opposite direction on its flange 10, constitutes with the valve and its spring a system in a state of balance which cannot itself change its initial position as long as the pressure of the liquid exists, that is to say until the arrest of movement. As in the damping device of the prior application, the movement is thus realized with a constant resistance, and the retraction of the rod retaining the balls has no influence on the position of the pusher during this phase of return.

At the arrest preceding the reversal of direction of movement, the pusher 9 falls back on the bowl 24 which reposes on the balls which occupy again their position of minimum spreading around the cylindrical extremity of the rod. The damping device is thus again ready to function.

As will be seen, the resistance of the damping device, which is weak for small strokes of the piston, will be increased according to the profile of the rod 25 for the important strokes.

The determination of the profile of the said rod is easy to obtain as a function of the flexibility of the suspension spring, whether the latter is constant or varied according to any given law. It is likewise possible to obtain a stiffening of the damping device at one or the other or at both extremities of its stroke, to the end of reducing for example the eventual risk of going solid.

If instead of mounting an obstacle, the wheel of the vehicle falls in a depression, the movement of expansion of the spring from its position of repose is not impeded by the damping device, the latter not being armed; the vehicle then undergoes only a small disturbance and conserves all its adherence, and the damping device resists only slightly the remounting of the wheel under the effect of encountering the other edge of the depression, because of the resistance created by the flexure of the membrane 32 which controls the passage of the excess of liquid provided by the penetration of the rod 4 into the cylinder.

In the variant of the axial ball and rod system shown in Figs. 2 and 3, the rod 25 has a generally cylindrical form and comprises one or more grooves 25a of variable depth which form cams for balls 22 lodged respectively in each of the grooves. As shown in Fig. 3, the section of the grooves may be rectangular or a segment of a circle, or of any other form.

This latter system permits moreover of actuating with the aid of a single rod the movable bowls of the piston of a damping device working in two directions and not merely in one like that shown in Fig. 1. In such a device, as shown in Fig. 6 of the prior application, the piston comprises at each end an obturating valve with its spring and pusher. To actuate the two pushers, two sets of balls are therefore required.

The control of these two sets can be effected with a single axial rod such as that shown on Figures 4 and 5, which rod comprises one or more cam grooves 25a like those of Figs. 2 and 3 for the control of the balls 22 of one pusher, and one or more other cam grooves 25b at 90° from the first grooves for the control of balls 22' of the second pusher. As will be seen, the depth of the grooves 25b varies in the reverse sense from that of the grooves 25a. As shown in Fig. 4, the piston 5 comprises, in addition to the pusher 10 controlling the pressure in the direction of extension as previously described with reference to Fig. 1, a second pusher 10' arranged exteriorly with respect to the first pusher and integral with a bowl 24' which is pushed by the balls 22' when the piston rises and compresses the spring 11', loading the valve 12'. Thus, according to the degree of extension of the absorber, the following movement of compression encounters a resistance the value of which is determined by the load of the spring 11' on the valve 12'. This resistance will likewise be maintained constant during the entire movement of compression, by reason of the fact that the pressure will be exerted likewise in the chamber 20' on a surface equivalent to the exposed surface of the valve 12'.

What is claimed is:

1. A hydraulic device for damping oscillations comprising a cylinder, a piston movable in said cylinder and dividing it into two liquid chambers, duct means through said piston for passage of liquid between said chambers, valve means carried by said piston for restricting the flow of liquid through said ducts and comprising a duct-obturating valve, a valve-loading device movable relative to the valve, and a loading spring interposed between said valve and device, control means for increasing the valve loading as said piston moves away from normal inoperative position comprising opposed bowl-shaped members carried by said piston, one of which is movable relative to the other for displacing said loading device, a set of balls between said members, and a rod of varying cross section which is stationary relative to said cylinder and passes through said members for displacing said balls laterally and moving said one member and said loading device by an amount corresponding to the amplitude of the piston stroke, and means for maintaining said loading device in its displaced position during the return stroke of the piston toward said normal position.

2. A device as defined in claim 1, said rod being cylindro-conical in form, the cylindrical portion thereof being smaller in diameter than the conical part and passing through said balls and members when the piston is in said normal position, said conical part entering said members on movement of said piston away from normal position, in the direction of said conical part.

3. A device as defined in claim 1, said rod having at least one longitudinal groove varying in depth and one ball moving in said groove as said piston moves relative to said rod.

4. A device as defined in claim 3 which is of double effect, said piston carrying two of said valve means each operative in one direction of movement of said piston from said normal position, and two of said control means, said rod having at least one longitudinal groove of varying depth for each control means.

5. A device as defined in claim 1, including a third chamber for compensating liquid, a duct connecting said third chamber to one of said first two chambers, a flexible membrane resiliently held in duct-closing position, said membrane lifting to permit free passage of liquid when said piston moves in the direction of aspiration with respect to said duct, said membrane being deformable to uncover a portion of said duct when said piston moves in the opposite direction.

MAURICE KATZ.

REFERENCES CITED

The following references are of record in the file of this patent:

UNITED STATES PATENTS

| Number | Name | Date |
|---|---|---|
| 2,106,461 | Leslie | Jan. 25, 1938 |
| 2,309,499 | Chenault | Jan. 26, 1943 |